US012763226B2

(12) United States Patent
Hartmann et al.

(10) Patent No.: US 12,763,226 B2
(45) Date of Patent: Oct. 13, 2026

(54) DEVICE FOR USE IN A FUEL ASSEMBLY OF NUCLEAR POWER PLANT, METHOD FOR MANUFACTURING A DEVICE AND METHOD FOR ACTIVATING A MATERIAL IN A NUCLEAR POWER PLANT

(71) Applicant: FRAMATOME GmbH, Erlangen (DE)

(72) Inventors: Bettina Hartmann, Erlangen (DE); Nico Vollmer, Forchheim (DE); Lars Ackermann, Erlangen (DE)

(73) Assignee: FRAMATOME GmbH, Erlangen (DE)

( * ) Notice: Subject to any disclaimer, the term of this patent is extended or adjusted under 35 U.S.C. 154(b) by 545 days.

(21) Appl. No.: 18/268,159

(22) PCT Filed: Dec. 23, 2020

(86) PCT No.: PCT/EP2020/087824
§ 371 (c)(1),
(2) Date: Jun. 16, 2023

(87) PCT Pub. No.: WO2022/135725
PCT Pub. Date: Jun. 30, 2022

(65) Prior Publication Data
US 2024/0006091 A1 Jan. 4, 2024

(51) Int. Cl.
*G21C 23/00* (2006.01)
*G21C 7/117* (2006.01)
(Continued)

(52) U.S. Cl.
CPC .............. *G21C 23/00* (2013.01); *G21C 7/117* (2013.01); *G21G 1/02* (2013.01); *G21C 3/326* (2013.01); *G21C 7/103* (2013.01)

(58) Field of Classification Search
CPC ........ G21C 23/00; G21C 7/117; G21C 7/103; G21C 3/326; G21G 1/02
(Continued)

(56) References Cited

U.S. PATENT DOCUMENTS 3,652,394 A * 3/1972 Braun ...................... G21C 7/22 376/327
4,888,151 A 12/1989 Gjertsen et al.
(Continued)

FOREIGN PATENT DOCUMENTS

CN 101447237 A 6/2009
CN 101606205 A 12/2009
(Continued)

OTHER PUBLICATIONS

AREVA Design Control Document Rev. 1, U.S. EPR Final Safety Analysis Report (FSAR), Tier 2, Chapter 4—Reactor, Section 4.2—Fuel System Design, NRC accession No. ML091671460 (May 29, 2009). (Year: 2009).*
(Continued)

*Primary Examiner* — Jack W Keith
*Assistant Examiner* — Daniel Wasil
(74) *Attorney, Agent, or Firm* — Davidson Kappel LLC

(57) ABSTRACT

The present disclosure relates to a device for use in a fuel assembly of a nuclear power plant. The device includes at least one rod, each rod including a plurality of containers having a space being filled with material to be activated. The device further includes a flow restrictor including a plurality of fingers adapted to extend respectively into a control rod guide tube of the fuel assembly. The at least one rod is connected to a finger of the flow restrictor. The containers are arranged subsequently in a direction of the longitudinal axis of the respective rod. The containers are connected to each other at a connecting portion. Each rod has a marking at a connecting portion. Each marking identifies the end of a space in a container and/or the end of a container.

13 Claims, 10 Drawing Sheets

(51) Int. Cl.

| | |
|---|---|
| ***G21G 1/02*** | (2006.01) |
| *G21C 3/326* | (2006.01) |
| *G21C 7/103* | (2006.01) |

(58) Field of Classification Search

USPC .................................................. 376/189, 202

See application file for complete search history.

(56) References Cited

U.S. PATENT DOCUMENTS

| | | | | |
|---|---|---|---|---|
| 8,638,899 | B2 * | 1/2014 | Smith ...................... | G21G 1/02 376/327 |
| 2009/0034674 | A1 | 2/2009 | Burger et al. | |
| 2009/0135988 | A1 | 5/2009 | Russell, II et al. | |
| 2010/0111243 | A1 * | 5/2010 | Monchanin ............ | G21C 7/117 376/353 |
| 2012/0087454 | A1 * | 4/2012 | Stucker .................. | G21C 17/10 376/191 |
| 2012/0195402 | A1 * | 8/2012 | Chahande .............. | G21C 7/103 376/412 |
| 2012/0281805 | A1 * | 11/2012 | Hone ....................... | G21C 7/10 376/327 |
| 2013/0329847 | A1 | 12/2013 | McCarty et al. | |
| 2016/0314863 | A1 | 10/2016 | Singh et al. | |
| 2024/0105354 | A1 * | 3/2024 | Heibel ..................... | G21G 1/02 |

FOREIGN PATENT DOCUMENTS

| | | | | | |
|---|---|---|---|---|---|
| CN | 104335287 | A | | 2/2015 | |
| CN | 105244069 | A | * | 1/2016 | |
| CN | 112117021 | A | * | 12/2020 | ............... G21G 1/02 |
| DE | 3437112 | A1 | | 5/1985 | |
| DE | 9105355 | U1 | | 7/1991 | |
| EP | 1667166 | B1 | | 9/2012 | |
| EP | 2120241 | B1 | | 6/2013 | |
| EP | 2073214 | B1 | | 9/2013 | |
| EP | 3091539 | B1 | | 4/2018 | |
| JP | H05100091 | A | | 4/1993 | |
| JP | H11202074 | A | | 7/1999 | |
| JP | 2000046979 | A | | 2/2000 | |
| JP | 2002214378 | A | | 7/2002 | |

OTHER PUBLICATIONS

NRC, HUS, "Westinghouse technology systems manual section 3.1 reactor vessel and internals". (2011). (Year: 2011).*

Corresponding Search Report and Written Opinion for PCT/EP2020/087824.

* cited by examiner

DEVICE FOR USE IN A FUEL ASSEMBLY OF NUCLEAR POWER PLANT, METHOD FOR MANUFACTURING A DEVICE AND METHOD FOR ACTIVATING A MATERIAL IN A NUCLEAR POWER PLANT

The present disclosure concerns a device for use in a fuel assembly of a nuclear power plant, the device comprises at least one rod, each rod a plurality of containers filled with material to be activated.

BACKGROUND

Further, the present disclosure relates to a method for manufacturing such a device, comprising the following steps: providing a plurality of containers to be filled with material(s) to be activated; filling the material(s) to be activated into the containers; and hermetically closing the containers.

According to another aspect, the present disclosure relates to a method for activating material in a nuclear power plant.

Generally, radioactive isotopes are needed for technical and medical applications.

EP 3 091 539 B1 discloses a system for generating isotopes like Cobalt-60 in a nuclear reactor startup source holder. The disclosure describes an irradiation target holder, which is configured to fit in open locations inside of an operating commercial nuclear core comprising fuel assemblies. The disclosure is related to a boiling water reactor.

EP 2 120 241 B1 discloses a fuel rod assembly comprising at least one irradiation target retention device, adapted to fit into a nuclear fuel rod. The irradiation target retention system includes at least two bores for the irradiation target.

EP 2 073 214 B1 discloses fuel rods having irradiation target end pieces. The irradiation target end pieces have connection elements, for example in form of a thread, configured to join the end pieces to an axial end of nuclear fuel rod.

EP 1 667 166 B1 relates to a method for producing isotopes in a nuclear reactor. For example a containment structure housing one or more targets may be placed within a control blade, not being used for reactor control but moved during cycle or into water rods or water channels, in particular the end plugs thereof. The water rods serving to transfer moderator fluid from the lower regions to the upper regions of the nuclear fuel bundle. The described solution is applicable for boiling water reactors.

SUMMARY

An object of the present disclosure is to provide alternative means for irradiating targets in a pressurized water reactor.

According to one aspect, a device for use in a fuel assembly of a nuclear power plant, the device comprises at least one rod, each rod comprises a plurality of containers having a space being filled with material to be activated, characterized in that the device further comprises a flow restrictor for a fuel assembly of a nuclear power plant comprising a plurality of fingers adapted to extend respectively into a control rod guide tube of the fuel assembly when the flow restrictor is inserted into the fuel assembly, wherein the at least one rod is connected to a finger of the flow restrictor, wherein the containers are arranged subsequently in a direction of the longitudinal axis of the respective rod.

Further embodiments may relate to one or more of the following features, which may be combined in any technical feasible combination:

- the containers are connected to each other at connecting portions with one or more screw connection or a welding;
- the at least one rod further includes a hollow tube, which extends from the fingers, wherein the containers are arranged within the hollow tube;
- each rod includes a plurality of markings on the exterior surface, wherein the markings are provided, in direction of the longitudinal axis of the rod, to identify the end of a space and/or the ends of the containers, wherein the markings are in particular a notch and/or an indent;
- the connecting portions, in particular the one or more screw connections of the connecting portions, are marked on the exterior side of the rod, in particular with a notch and/or an indent;
- the outer diameter of the containers or the at least one hollow tube corresponds to the inner diameter of the control rod guide tubes wherein in particular the outer diameter of the containers or the at least one hollow tube is about 100 μm smaller than the inner diameter of the control rod guide tube of the fuel assembly;
- the screw connections are pressed or squeezed after their assembly, in particular to form the marking of the connecting portion and/or to disable loosening of the screw connection;
- the containers are made of stainless steel, Al- or Zr-alloy
- the material to be achieved by the material to be activated is a radioactive isotope of Co, Mo, Sr, Y or combinations thereof;
- the rod is connected to the flow restrictor using one or more screw connections or a welding;
- the flow restrictor has the shape of a control rod assembly upper portion;
- the fingers have a length adapted to extend about 15 cm into the control rod guide tubes when the device is inserted into fuel assembly; and/or
- the flow restrictor is made of zirconium.

According to another aspect, a method for manufacturing such a device is provided comprising the following steps:

- providing a plurality of containers having a space to be filled with material to be activated;
- filling the material to be activated into the containers;
- hermetically closing the containers;
- connecting a predefined amount of containers with each other by respectively at least one screw connection to form at least one rod; and
- connecting the at least one rod to an finger a flow restrictor for a fuel assembly of a nuclear power plant, the flow restrictor comprising a plurality of fingers.

Further embodiments may relate to one or more of the following features, which may be combined in any technical feasible combination:

forming at least one rod by a predefined amount of containers comprises connecting the containers with each other by respectively at least one screw connection or a welding to form at least one rod;

- marking on the exterior surface, wherein the markings are provided, in direction of the longitudinal axis of the rod, to identify the end of a space and/or the ends of the containers, wherein, in particular, the markings are provided at a predefined distance from the ends of the containers and/or the space in direction of the longitudinal axis; and/or the marking is made by providing a notch and/or an indent.

According to another aspect, a method for activating material in a nuclear power plant, in particular a pressurized water nuclear power plant, is provided comprising the following steps:

providing an device according to an embodiment disclosed herein;

inserting the device into a fuel assembly and, during outage of the nuclear power plant, providing the fuel assembly into the nuclear core of the nuclear power plant, or inserting the device during outage of the nuclear power plant into a fuel assembly of the nuclear core;

operating the nuclear power plant;

during outage of the nuclear power plant, removing the fuel assembly from the nuclear core of the nuclear power plant.

Further embodiments may relate to one or more of the following features, which may be combined in any technical feasible combination:

determining the activation of the material to be activated and in case the material is sufficiently activated: removing the at least one rod from the fuel assembly, cutting into segments or opening at least one rod, in particular at the markings.

Further advantages, features, aspects and details are evident from the dependent claims, the description and the drawings.

So that the manner in which the above recited features of the present disclosure can be understood in detail, a more particular description of the present disclosure, briefly summarized above, may be read by reference to embodiments. It is to be noted, however, that the appended drawings illustrate only typical embodiments of this present disclosure and are therefore not to be considered limiting of its scope, for the present disclosure may admit to other equally effective embodiments.

BRIEF SUMMARY OF THE DRAWINGS

The accompanying drawings relate to embodiments of the present disclosure and are described in the following.

DETAILED DESCRIPTION

Figure 1:
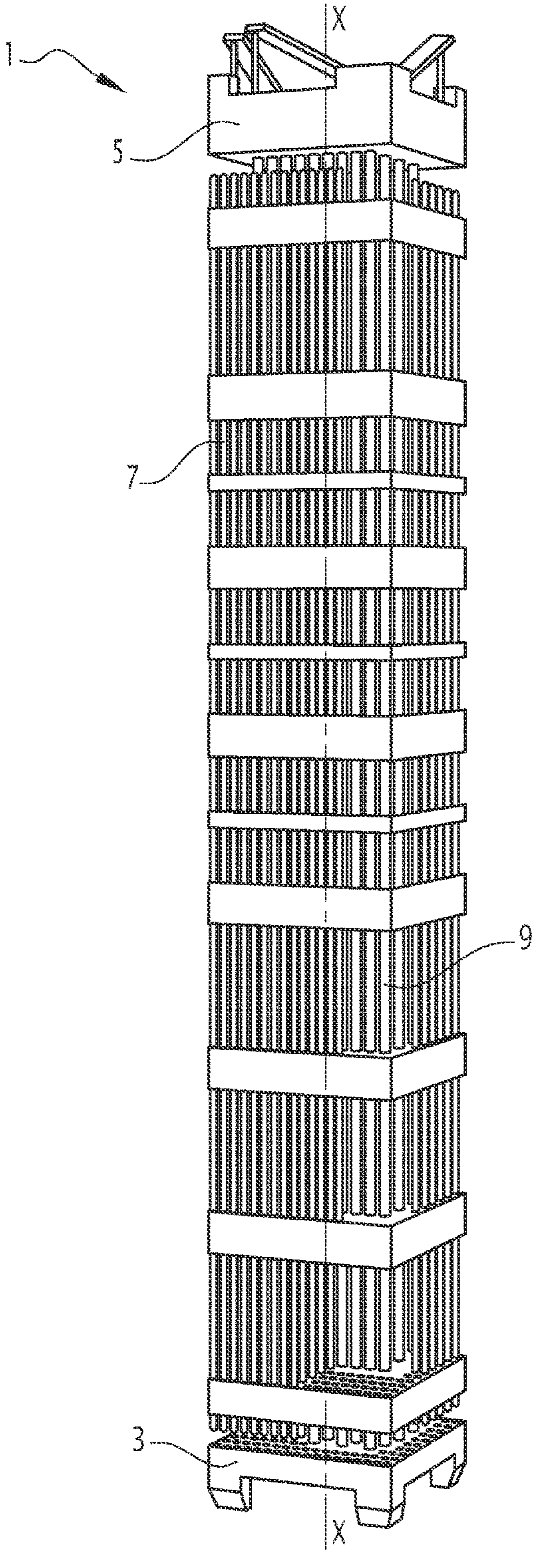
FIG. 1 shows schematically a perspective view of a fuel assembly for a nuclear power plant.
Figure 4:
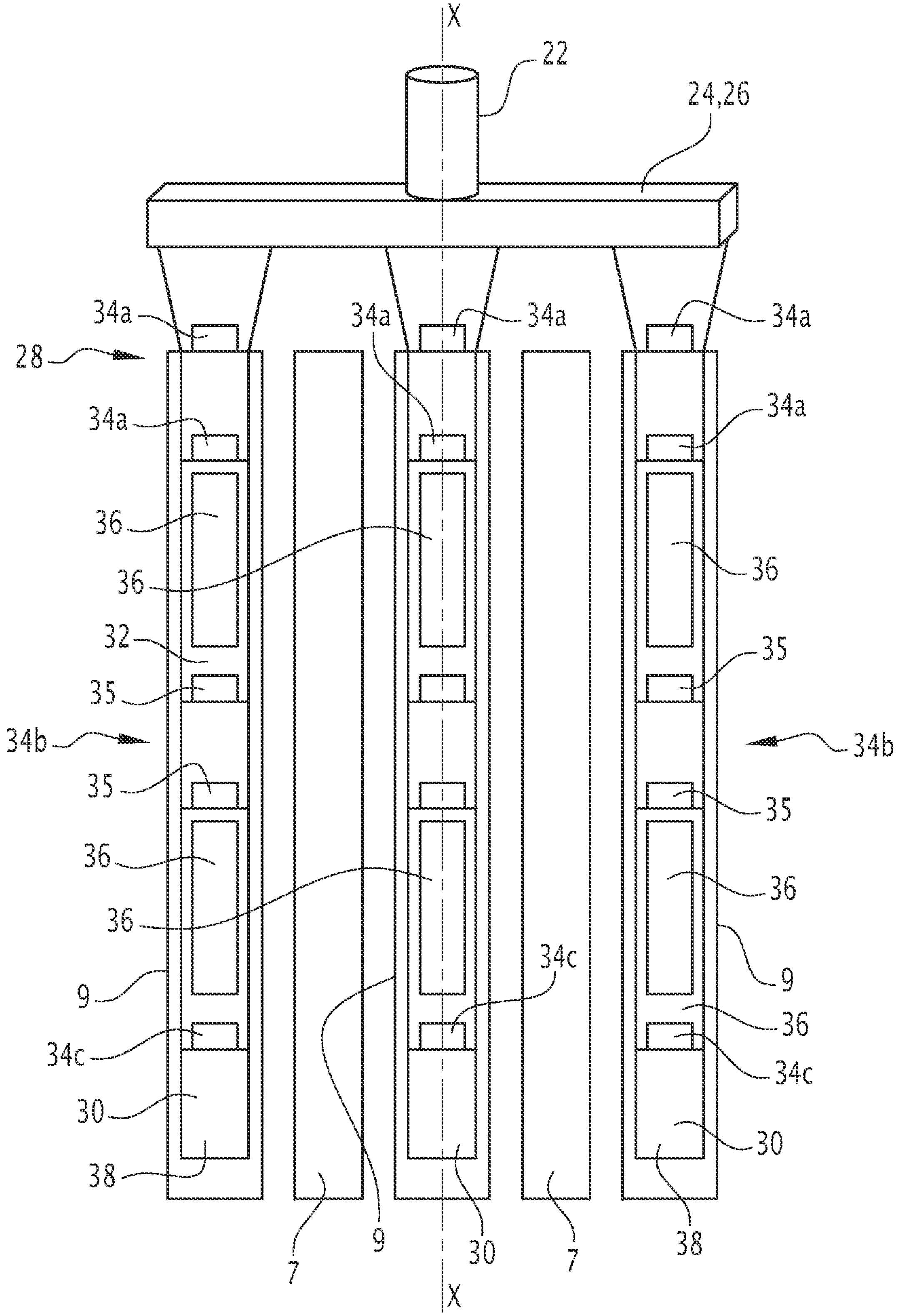
FIG. 4 shows a schematic cross sectional side view of an embodiment of a device according to the present disclosure.

FIG. 1 shows schematically a perspective view of a fuel assembly 1 for a nuclear power plant. The nuclear power plant is used for generating electricity in which as a heat source a nuclear reactor is used. The nuclear power plant includes a reactor vessel in which a plurality of fuel assemblies 1 are arranged. The plurality of fuel assemblies represent the reactor core of the nuclear power plant. With respect to FIGS. 4 and 5, the arrangement of the fuel assemblies within the reactor core will be explained. Further, a primary cooling e.g. by water circuit is connected to the reactor vessel, which transports the heat generated by the fuel assemblies 1 during operation to a heat exchanger and/or to a turbine. There are several types of nuclear power plants, in particular pressurized water reactors and boiling water reactors.

The fuel assembly 1 has a longitudinal axis X, in which the fuel assembly 1 extends.

The fuel assembly 1 shown in FIG. 1 is used to group a plurality of fuel rods. The fuel assembly 1 has, in a plane orthogonal to the longitudinal axis X a substantial rectangular shape. According to embodiments, a fuel assembly 1 has a typical length between 2 m and 6 m. In other embodiments, the fuel assembly may have also other shapes a plane orthogonal to the longitudinal axis X, for example hexagonal shapes.

In some embodiments, the fuel assembly 1 comprises a bottom end piece 3. For example, the bottom end piece forms a plurality of nozzles. The nozzles are provided to distribute the fluid flow in a regular manner.

Further, the fuel assembly 1 includes a top end piece 5. The top end piece 5 is provided to carry the fuel assembly 1. Further, the top end piece 5 can act as a plurality of nozzles for the cooling fluid of the primary cooling water circuit.

For example, a fuel assembly 1 includes plurality fuels rods 7, which extend in parallel to the longitudinal axis. The fuel rods 7 are spaced in a regular pattern. In the embodiment shown in FIG. 1, the fuel rods 7 are arranged in a pattern 17×17. In other embodiments, the fuel assembly 1 may include fuel rods 7 in a pattern of 14×14.

The fuel assembly 1 further includes one or more control rod guide tubes 9 for control rods. The control rod guide tubes 9 for the control rods are provided at specific positions within the fuel assembly 1. The control rod guide tubes 9 extend in parallel to the longitudinal axis X.

The control rod guide tubes 9 are fixed to the bottom end piece 3 and the top end piece 5.

The control rod guide tubes 9, together with the top end piece 5 and the bottom end piece 3 and some distance pieces the skeleton of the fuel assembly 1. The fuel rods 7 are hold by the distance pieces. For example, the distance pieces can include some spring elements for holding the fuel rods 7. Further, also the top end piece can include the springs in order to hold down the fuel assembly, as during the operation of the nuclear power plant the water flow in the upward direction is rather strong.

If control rods are inserted into the control rod guide tubes of the fuel assembly 1, these control rods are moved together. These control rods are therefore arranged in a rod cluster control assembly (RCCA).

Figure 5:
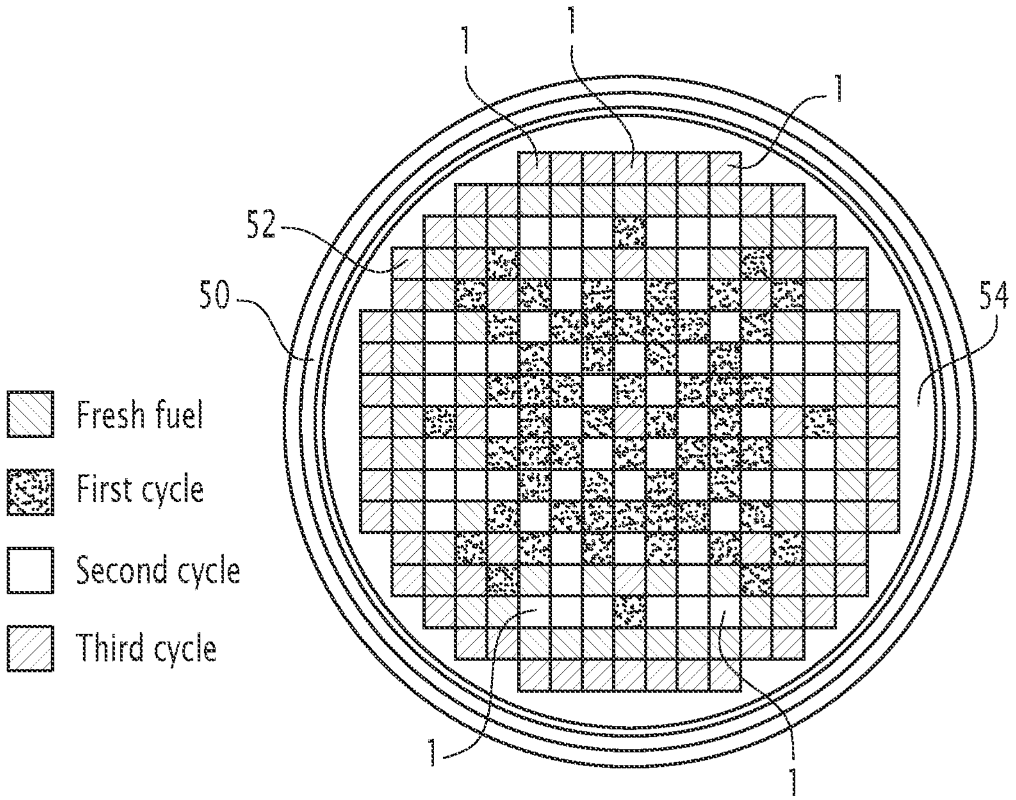
FIG. 5 shows a cross sectional top view of a reactor pressure vessel including fuel assemblies of the core and a typical loading pattern of them.

As it will be seen with respect to FIGS. 5, not all fuel assemblies are provided with a RCCA. Some fuel assemblies have a Rod Cluster Control Assembly (RCCA) and some not. In the following, the Rod Cluster Control Assembly is also called control rod assembly.

All the fuel assemblies in the nuclear core should have similar thermohydraulic properties. For control rod guide tubes 9 not used for control rods, the control rod guide tubes 9 will temporary plugged by a so called flow restrictor as it will be explained here below. By this, the thermohydraulic properties in all guide tubes are similar.

Figure 2:
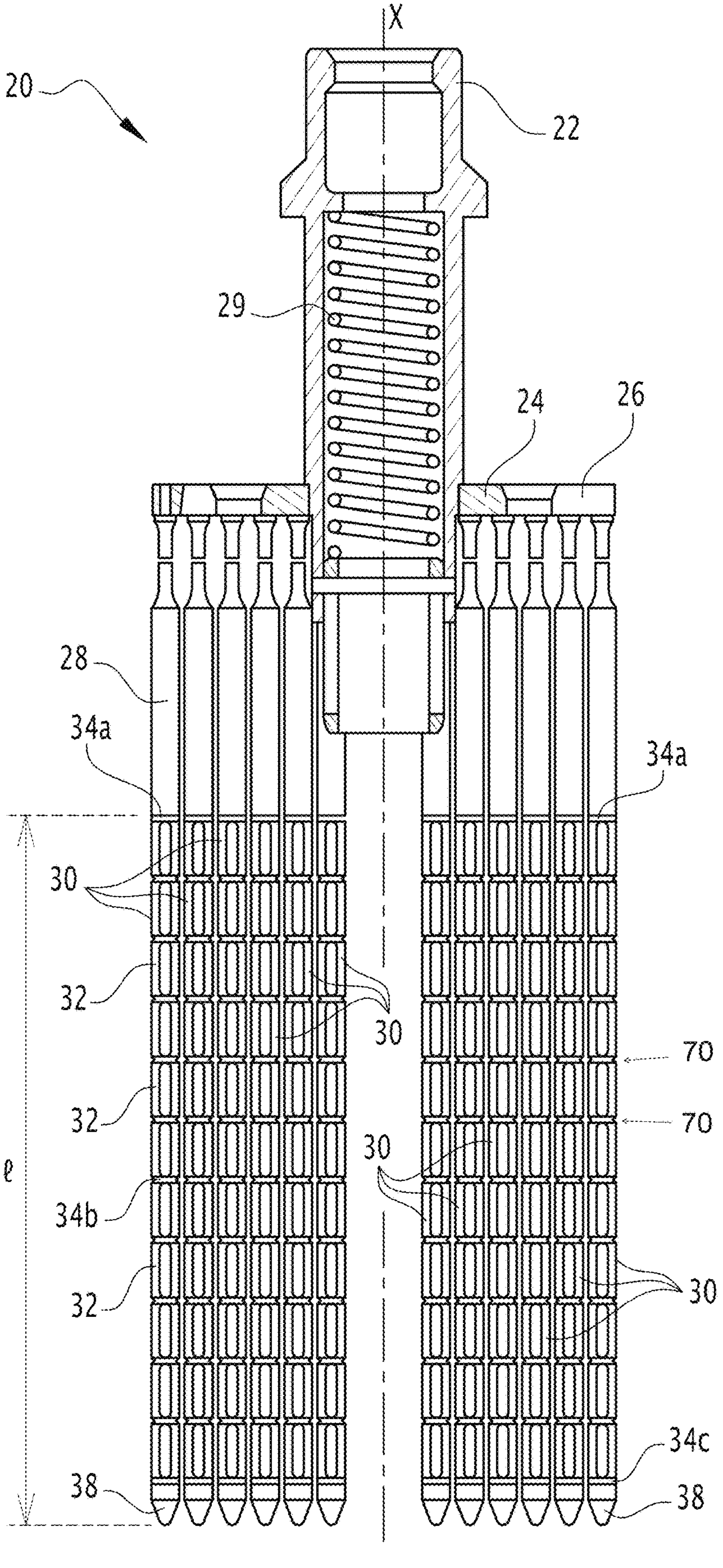
FIG. 2 shows schematically a cross section of a device according to the present disclosure.
Figure 3:
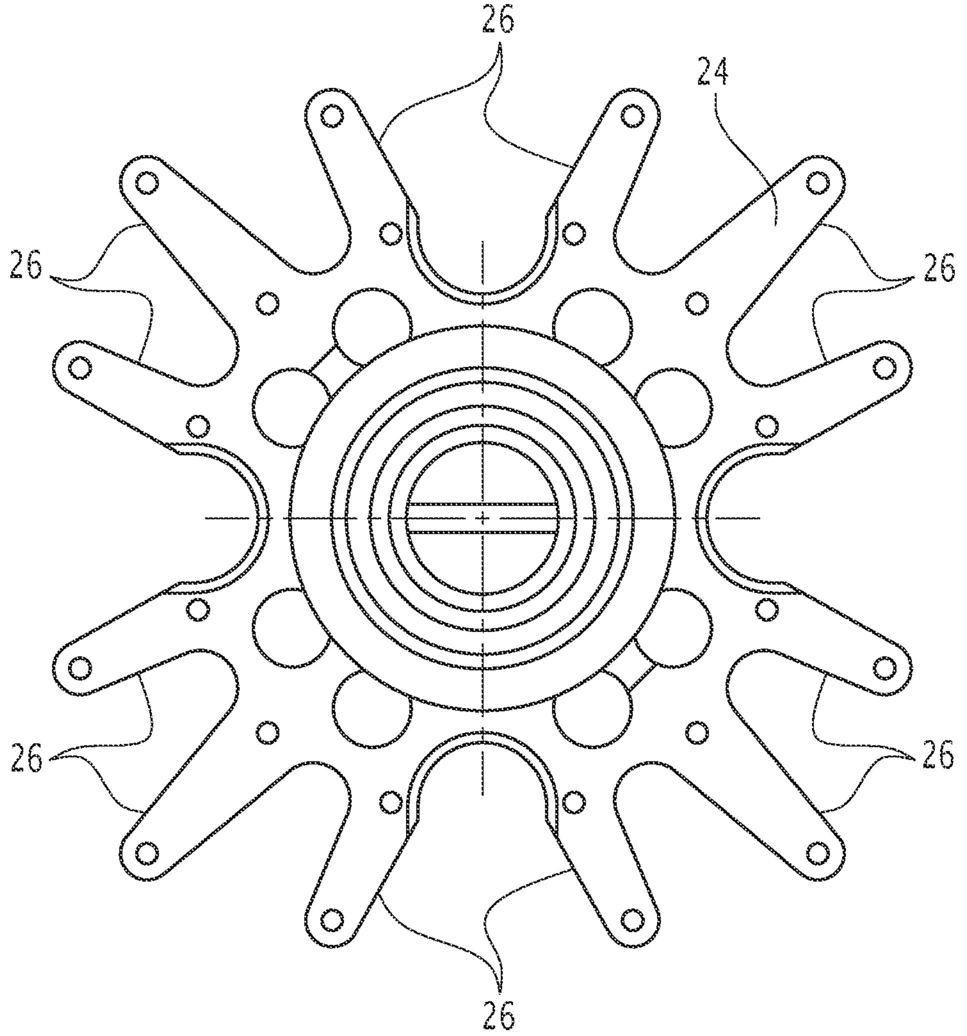
FIG. 3 shows a top view of the device of FIG. 2.

FIG. 2 shows in a sectional side view an embodiment of a device 20 for a fuel assembly 1 of a nuclear power plant. FIG. 3 shows a top view of the device 20. The device 20 includes at its upper end a coupling piece 22. The coupling piece 22 is provided in order to move the device 20 into and out of the fuel assembly 1. The device 20 has the similar longitudinal axis X as the fuel assembly 1.

Further, the device 20 includes a plate 24 forming a plurality of arms 26. The arms are rigidly connected to the coupling piece 22. From each arm 26, one or more fingers 28 extend in parallel to the longitudinal axis X. For example, two fingers 28 extend from each arm 26 in parallel to the longitudinal axis X. The number of fingers depend on the design of the fuel assembly 1. For example, the device 20 may include between 15 and 30 fingers. The lower side of the plate 24 is provided to be placed on the top end piece 5 of the fuel assembly 1. The fingers extend through the top end piece 5 into the control rod guide tubes 9. In other words, the length of the fingers 28 depend on the dimensions of the fuel assembly 1.

For example, in an embodiment, the fingers have a length of at least 20 cm.

According to an embodiment, the fingers 28 have a length adapted to extend at least 15 cm into a control rod guide tube 9, when the device 20 is fully inserted into the fuel assembly 1. In an example, the fingers have a lengths adapted to extend 25 cm into the control rod guide tubes 9, when the device 20 is fully inserted into the fuel assembly 1. Under fully inserted it is meant that the plate 24 is positioned on the top end piece 5 of the fuel assembly. In such a case, the device 20 is not able to move forward further downward. According to embodiments, the device is hold down by a spring 9 to ensure that it does not move during operation of the nuclear reactor. By this, it blocks coolant flow and keep the activation material in a constant height inside active zone.

The plurality of arms 26, and in particular the coupling piece 22 and/or the fingers 28 form a flow restrictor in order to (hydraulically) simulate a missing RCCA. According to embodiments, the flow restrictor has the shape of a control rod assembly upper portion. The flow restrictor, in particular the coupling piece 22, the fingers 28 and/or the arms 26 are made of zirconium.

In an embodiment, the coupling piece 22 includes a spring 29. The spring 29 is provided to fix the device 20 within the fuel assembly 1.

From one or more fingers 28 one rod 30 extend in parallel to the direction of the longitudinal axis X. For example, the rods 30 form a longitudinal extension of the fingers 28. In other words, the external diameter of the rods corresponds to the maximal diameter of the fingers 28. In some embodiments, the fingers 28 may have at their upper end a local diminution. For example, the diminution may have a length of between 5 cm and 10 cm. The diminution is rotationally symmetric. The rods 30 have for example a diameter such that the fit into the control rod guide tubes 9. In other words, the outer diameter of the rods 30 correspond to the inner diameter of the control rod guide tubes 9. Thus, at least 10, in particular more than 15 rods 30 may be attached to the fingers 28.

The rods 30 are for example connected to the fingers 28 using one or more screw connections **34*a*. In other words, each rod is connected to the flow restrictor using the screw connection 34*a*. For that purpose, the lower end of the fingers 28 are provided with male or female threads. In other embodiments, the rod 30 may be welded or crimped to the fingers 28**.

For example, the rods 30 may have an outer diameter of between 7 mm and 15 mm, in particular between 9 mm and 11 mm, for example 10.4 mm. In some embodiments, the rods may have a length l of between 2 m and 4.80 m. The total lengths of the fingers 28 and the rods 30 is between 3 and 5 m. Maximum length, maximum diameter, and maximum number of fingers is given by the reactor design. For example, the maximum lengths depend on the active lengths of the nuclear core.

In the following, the rods 30 are described in more detail with respect to the FIGS. 2 and 3. Each rod 30 includes a plurality of containers 32. The containers **32*b* have a cylindrical shape with a circular cross section. The containers 32 are connected to each other at connection portions 34*b* in a rigid way. The containers 32 are connected to each other in a rigid way at connecting portions 34*b* with one or more screw connections 35. For example, the container have threaded ends in direction of the longitudinal axes. For example, the first end in axial direction may have a male thread and at the second end in axial direction may have corresponding a female thread or vice versa. The female thread fits with the male thread. The lengths of the containers 32** in direction of the longitudinal axis depend on the amount of the material to be activated.

In some embodiments, an intermediate piece may be provided between two subsequent containers 32. The intermediate piece forms the connecting portion **34*b* and comprises respectively one female or male threads at its ends in longitudinal direction that form with the male or female thread the screw connections 35**. The intermediate piece may be produced from stainless steel.

In embodiments, the containers 32 are arranged in a sequence in parallel to the longitudinal axis X, in particular direction of the longitudinal axis of the respective rod 30.

In some embodiments, the fingers 28 and/or the connection portions **34*b* include an expansion joint. The expansion joint may compensate the thermal and irradiation enforced extension of the respective rod 30** or parts thereof.

According to examples, the device 20 does not include movable parts, except the spring 29 and/or the expansion joint(s). In other words, the rods 30, the fingers 28, the arms 26 and the coupling piece 22 are substantially not movable with respect to each other.

Further, the containers 32 may be filled with a material 36 to be activated. For that purpose, the containers comprise a closed space. The closed space inside the containers 32 for the material to be activated can have a length in direction of the longitudinal axis X of between 10 cm and 1 m. In some embodiments, the closed space inside the containers has a cylindrical shape. The closed space inside the container may have a diameter, which is about 0.4 cm smaller than the outer diameter of the container 32. In some embodiments, the closed space inside the containers may have a radius between 3.5 micrometer and 4, micrometers, in particular between 3.8 micrometers and 4.2 micrometers, for example 4, 1 micrometers. The diameter depends on the reactor design, in particular on the fuel assembly design.

According to embodiments, the plurality containers 32 represent at least 70% of the length of each rod 30 in direction of the longitudinal axis X, in particular up to 98% of the length.

In some embodiments, each rod 30 include at its distal end a tip 38. The tip 38 is connected at a connection portion 34 with a screw connection **34*c* to a container 32. In embodiments, the tip 38** has a length of between 5 and 30 cm in direction of the longitudinal axis X, in particular between 5 and 15 cm.

According to embodiments, the material to be achieved by the material to be activated is a radioactive isotope of Co, Mo, Sr, Y or combinations thereof. In some embodiments, the material to be activated may be in a liquid, solid or gaseous form. The achieved isotopes are for example Co-60, Mo-99, Sr-90, Y-90. In other embodiments, the material to be activated is provided as pellet or as a bar. For example, Co-59 may be provided in form of a bar, for example a cylinder, with a radius of 4, micrometers and a length of 30 cm. Each container may include a different material.

Due to the possible size of the closed space inside the container 32 more than 1 Kg of material to be activated can be inserted in a single rod 30.

In some embodiments, the containers 32 are made of Zr or Zr-alloys, for example ZrY-4. In other embodiments, the containers are made of stainless steel.

According to embodiments, the outer diameter of the containers 32 correspond to the outer diameter of the rod 30. In other words, the outer diameter of the containers 32 correspond to the inner diameter of the control rod guide tubes 9.

In some embodiments, which may be combined with other embodiments disclosed herein, each rod 30 includes markings 70 (see FIG. 2) on the exterior surface, the markings 70 are provided, in longitudinal direction of the rod or in direction of the longitudinal axis X, to identify the ends of the containers 32 and/or the spaces in which the material to be activated is filled in. For example, the markings 70 are in particular a notch and/or an indent. In some examples, the markings 70 are provided about at the same position in direction of the longitudinal axis X at the end of the containers 32 in the longitudinal direction, in particular slightly outside of the closed space in proximal and distal direction of the rods 30.

In an embodiment, the connecting portions 34*b*, in particular the screw connections 34*a*, 34*c*, 35 are provided with the marking 70 on the exterior side of the rod, in particular with the notch and/or the indent. For example, the marking 70 may be provided at a predefined distance from the ends of the containers 32 and/or the closed space in direction of the longitudinal axis X.

The screw connections 34*a*, 34*c*, 35 are pressed or squeezed afterwards to form the marking 70 of the connecting portion. Afterwards means that the screw connections 34*a*, 34*c*, 35 are pressed or squeezed after the respective parts, for example the containers 32, the tips 38 and the fingers 28 have respectively been screwed together. Further, the pressing or squeezing of the screw connections 34*a*, 34*c*, 35 disables a loosening of the respective connections, in particular during operation of the nuclear power plant.

Figure 6:
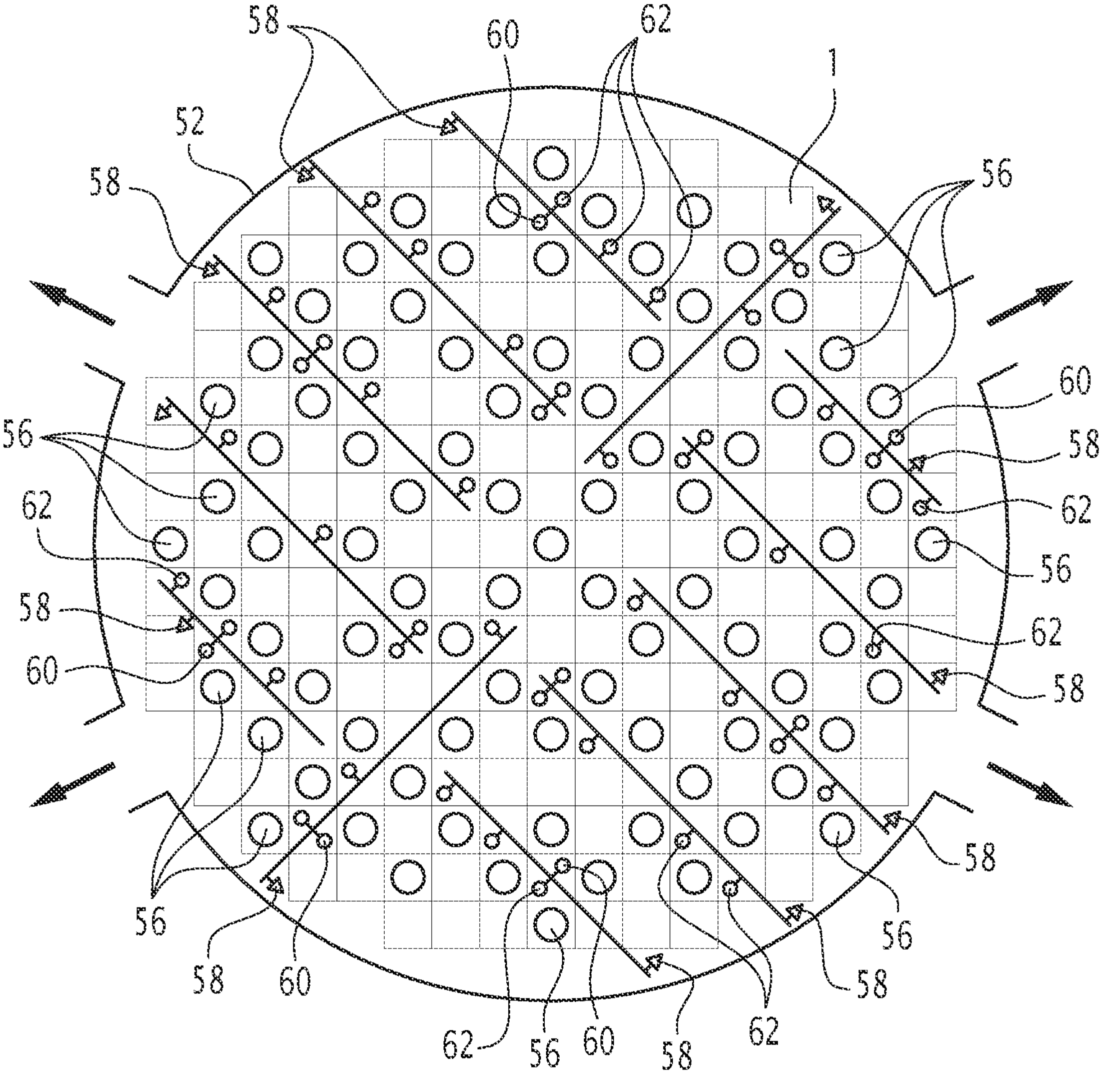
FIG. 6 shows a cross sectional top view of a reactor pressure vessel including positions of control rods and instrumentation positions.

FIG. 5 and FIG. 6 respectively show a cross sectional top view of a reactor vessel 50. These figures show the cross section of the nuclear core 52. Within the nuclear core a plurality of fuel assemblies 1 are arranged. The fuel assemblies 1 are shown as squares in FIGS. 5 and 6. Their position within the nuclear core 52 of a fuel assembly 1 depend on number of cycles. Usually older fuel assemblies are positioned more in the periphery compared to fresh fuel assemblies. The reactor pressure vessel 50 is filled with water of the first cooling circuit. For example, in a nuclear core of a nuclear reactor may be 193 fuel assemblies (type KWU Vor/Konvoi) or 241 for the Enhanced Pressurized Reactor (EPR).

FIG. 6 shows the positions of the fuel assemblies 1, which are provided with control rod assemblies 56. In other words, each of those fuel assemblies 1 is provided with a control rod assembly 56. The reference sign 58 designates the position of the reactor pressure vessel instrumentation nozzles with instrumentation lances. Reference sign 60 designates the power density detectors and thermocouples. Reference sign 62 designates the position of the aeroball probes. About half of the fuel assemblies in the nuclear core 52 are provided with rod cluster control assemblies in order to control the produced power of the nuclear reactor.

According to embodiments, the device 20 may be arranged at positions, where no control rod assembly or RCCA is provided. For example, the device 20 may be positioned at about 90 to 180 positions in a nuclear core 52. In the Konvoi type nuclear reactor, for example, the device 20 may be positioned at 132 positions and in the EPR at 152 positions.

The positioning may be selected depending on the desired activation. A higher activation is provided in the central regions of the nuclear core 52 and a lower activation is provided in the peripheral regions of the nuclear core 52.

In particular, when the assemblies 20 are arranged in the periphery of the nuclear core 52, for example in the outermost positions, the assemblies 20 may have a shielding effect, so that the reactor pressure vessel 50 is less exposed to radiation. This may extend the life time of a nuclear reactor. This may also avoid the employment of specific shielding fuel assemblies.

Further, the material to be activated and the amount of material may also have an effect on the nuclear core and the shielding effect.

The assemblies 20 prevent that the cooling fluid or water of the primary circuit flow through the control rod guide tubes 9. The assemblies 20 may thermohydraulic simulate the missing RCCA.

Figure 7:
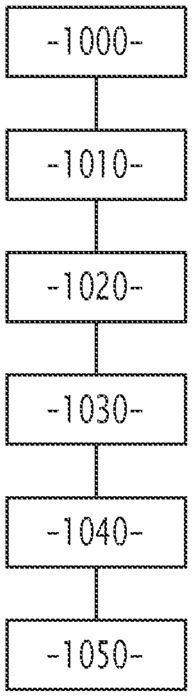
FIG. 7 shows a flow chart of a method according to an embodiment of the present disclosure.

FIG. 7 shows a flow chart of a method according to an embodiment of the present disclosure.

In step 1000, a plurality of containers 32 is provided to be filled with material to be activated. As indicated above, the material to be achieved by the material to be activated may be a radioactive isotope of Co, Mo, Sr, Y or combinations thereof. In other embodiments, also other material to be activated may be used Then, in step 1010, the material to be activated is filled into the containers 32. Subsequently, in step 1020 the containers 32 are hermetically closed, in particular under inert gas. For example, a lid may be provided and welded to the rest of the body of the container 32. The ends of the containers 32 in axial direction present respectively threads in order to form a screw connection with another container 32 or the fingers 28 of the flow restrictor. For example, the upper end in axial direction has a male thread and the lower end in axial direction has a female thread.

In step 1030, the containers 32 are connected to each other using the screw connection to form at least one rod 30. For example, a predefined amount of containers 32 is rigidly connected to each other with a screw connection. In some embodiments, also a tip 38 as fixed at one end of the rod 30. For example, a rigid connection is for example a connection where the different containers cannot move with respect to each other, after they have been connected to each other.

In step 1040, the one or more rods 30 are connected to respectively one finger 28 of a flow restrictor for a fuel assembly. As described above, the flow restrictor comprises a plurality of fingers 28.

In step 1050, the ends of the containers might be marked on the rods. For example, the screw connections 34*a*, 34*b*, 35 are squeezed or pressed. For example, the marking 70 may be provided at a predefined distance from the ends of the containers 32. For example, the marking 70 may be provided at a predefined distance from the ends of the containers 32. According to embodiments, the marking 70 is made by providing a notch and/or an indent.

Figure 8:
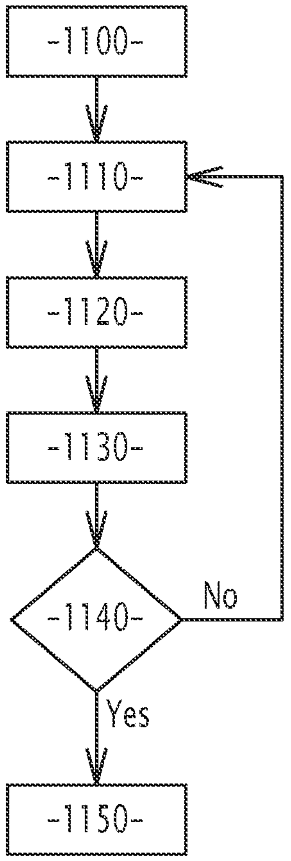
FIG. 8 shows another flow chart of a method according to an embodiment.

FIG. 8 shows another flow chart of a method according to an embodiment, which shows in particular a flow chart for a method for activating a material in a nuclear power plant.

In step 1100, a device 20 is provided. For example, the device 20 is produced according to the method shown in FIG. 7.

In step 1110, the device 20 is inserted into a fuel assembly 1. For example, the rods 30 are inserted into the control rod guide tubes 9 of the fuel assembly 1. In other words, the device 20 can be only inserted into those fuel assemblies 1, where no control rods should be inserted into the control rod guide tubes 9. The position may be optimized depending on the position of the fuel assembly 1 within the nuclear core 52. For example, the device 20 may be in addition or alternatively rotated. Then, during outage of the nuclear power plant, the fuel assembly 1 is inserted into the nuclear core 52 of the nuclear power plant.

In other embodiments, the device 20 is inserted into a fuel assembly, which is already be present in the nuclear core 52.

In step 1120, the device 20 is irradiated during the operation of the nuclear power plant.

In step 1130, the operation of the nuclear power plant is stop, i.e. the next outage of the nuclear power plant, the fuel assemblies 1 is removed from the core of the nuclear power plant. For example, the fuel assemblies 1 are moved into a fuel pool. In some embodiments, the device 20 is inspected and the activity of the material to be activated is determined. The device 20 can be separated from the respective fuel assembly 1.

In step 1140, it is determined whether the material is sufficiently activated.

In case the material is not sufficiently activated, it is processed again to step 1110, and the device 20 will be irradiated again in the next cycle. For example, the position of the device 20 may be optimized or modified within the nuclear core 52 in order to obtain an optimal radiation profile or activation. Additionally, or alternatively, the device 20 is rotated about a specific angle for example 90, 180, or 270 degrees.

If the material is sufficiently activated, in step 1030, the rods 30 are removed from the fuel assembly 1, and rods are opened or cut into segments, preferably at the markings 70 provided or depending on the markings 70 provided. The markings 70 enable to cut the rods 30 without destroying the containers, in particular the closed space of the containers 32. Then, the material to be activated is removed and further treated, for example physically or chemically. In other embodiments, the nuclides may be separated. The activated material may be used for industrial or medical applications.

Figure 9:
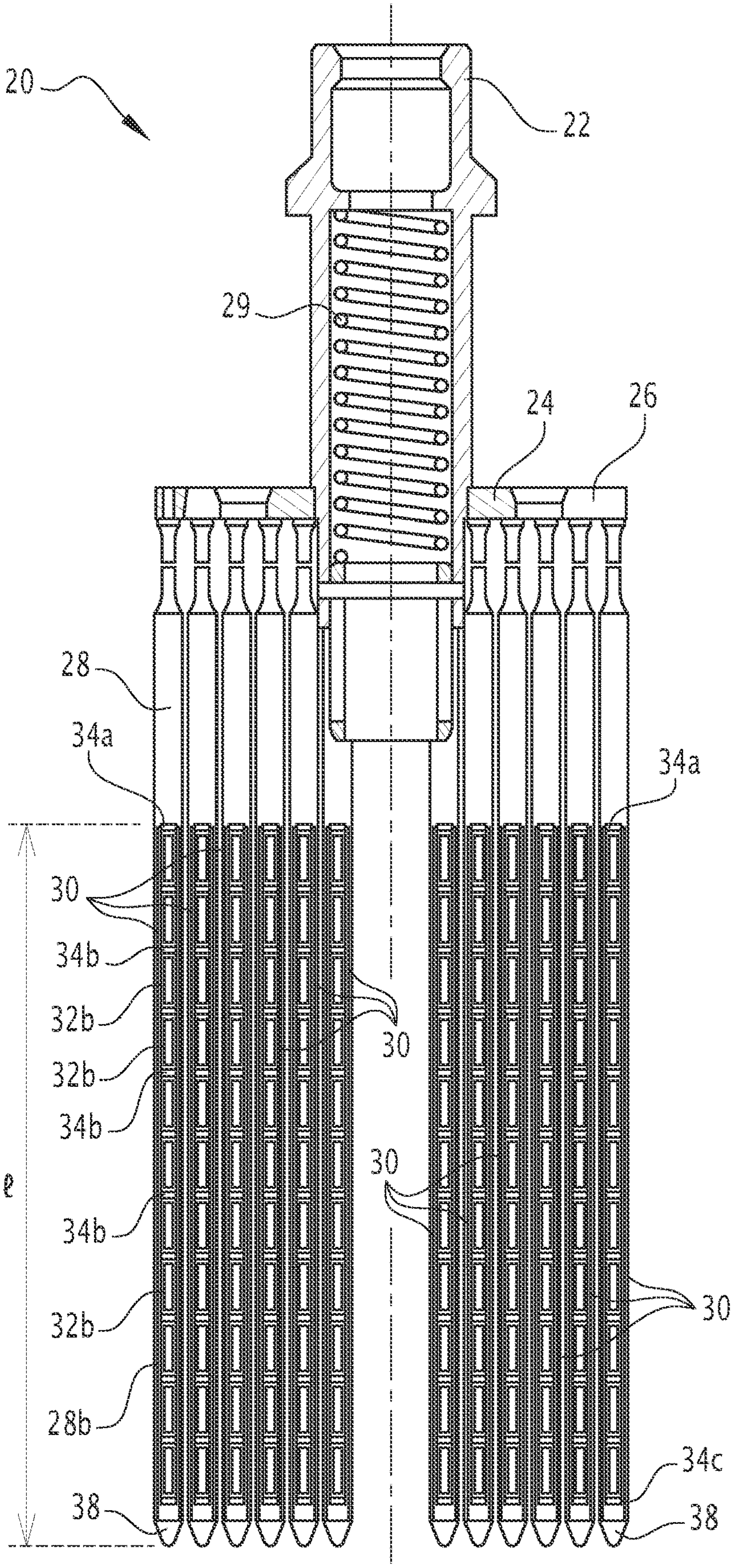
FIG. 9 shows schematically a cross section of a device according to the present disclosure.

FIG. 9 shows a further embodiment of a device 20 according to the present disclosure. The same features are designated with the same reference signs as in the previous embodiments.

In the embodiment, the fingers 28 are respectively extended with a hollow tube 28*b* in parallel to a direction of the longitudinal axis X. The hollow tube 28*b* has an outer diameter which is about 100 μm smaller than the inner diameter of the control rod guide tube 9 of the fuel assembly 1. In an example, the hollow tube 28*b* is closed at its lower end in FIG. 9. In a particular embodiment, the hollow tube 28*b* is provided with a tip 38.

A plurality of containers 32*b* are arranged within the hollow tube 28*b*. The containers 32*b* are connected at connection portions 34*b* to each other for example by a screw connection or a welding. This is done in the same way as in the embodiment described with respect to FIGS. 2 and 4. The lengths of the containers 32*b* in direction of the longitudinal axis X depend on the material and the quantity of the material to be activated. The containers 32*b* have a cylindrical shape with a circular cross section. The containers comprise an interior closed space for the material to be activated. According to some embodiments, the outer diameter of each container 32*b* is at least 100 μm smaller than the inner diameter of the hollow tube 28*b*.

In an embodiment, the uppermost container, in FIG. 9, is connected to the finger 28 with a connecting portion 34*a*. The connecting portion 34*a* may be a screw connection or a welding. In the embodiment of FIG. 9, the containers 32*b* form together with the hollow tube 28*b* the rod 30.

Each hollow tube 28*b* is connected to the respective finger 28 with a screw connection or a welding, in particular after the plurality of containers 32*b* having been connected to the finger 28.

Figure 10:
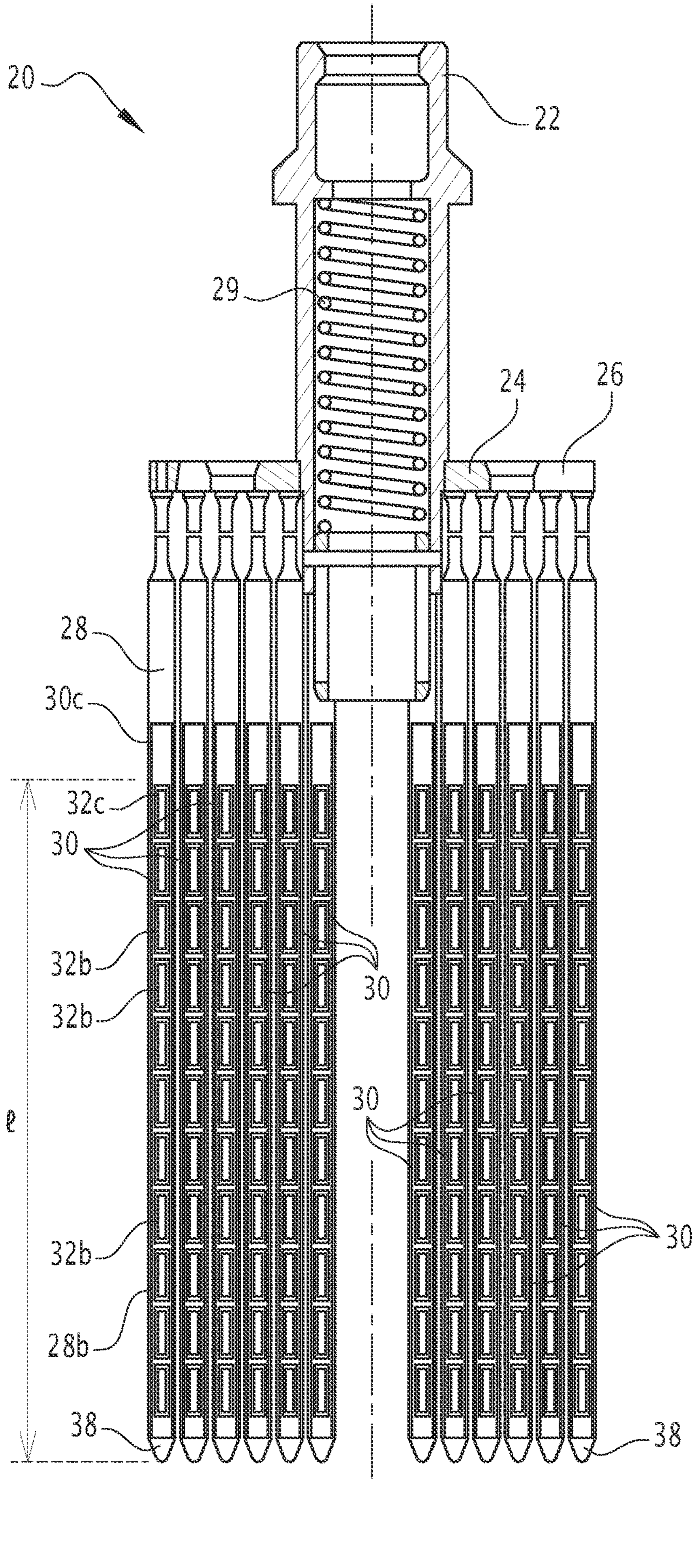
FIG. 10 shows schematically a cross section of a device according to the present disclosure.

FIG. 10 shows a further embodiment of a device 20 according to the present disclosure. The same features are designated with the same reference signs.

In the embodiment, the fingers 28 are extended with a hollow tube 28*b* in parallel to a direction of the longitudinal axis X. The hollow tube 28*b* has an outer diameter which is about 100 μm smaller than the inner diameter of the control rod guide tube 9 of the fuel assembly 1. The hollow tube 28*b* is closed at its lower end in FIG. 9. In a particular embodiment, the hollow tube 28*b* is provided with a tip 38.

A plurality of containers 32*c* are arranged within the hollow tube 28*b*. The containers 32*c* are not connected to each other. The lengths of the containers in direction of the longitudinal axis X depend on the material and the quantity of the material to be activated. The containers 32*c* have a cylindrical shape with a circular cross section. The containers comprise a interior closed space for the material to be activated. According to some embodiments, the outer diameter of each container 32*c* is at least 100 μm smaller than the inner diameter of the hollow tube 28*b*. In the embodiment of FIG. 9, the containers 32*b* form together with the hollow tube 28*b* the rod 30.

Each hollow tube 28*b* is connected to the respective finger 28 with a screw connection or a welding, in particular after the plurality of containers 32*c* having been introduced into the hollow tube 28*b*.

The embodiments shown in FIGS. 9 and 10 benefit from a higher protection of the containers, in particular in view of debris in the coolant and the contamination. In the embodiment of FIG. 10, the containers can be exchanged in a quick way.

The embodiment of FIG. 2 has provides the most space of the material to be activated and also the highest conversion rate. Further, the embodiment of FIG. 2 provides the fastest access to the material to be activated after the irradiation.

Embodiments of the present disclosure allow breeding of desired isotopes. Further, if the assemblies are provided in peripheral places in the reactor core the assemblies may reduce the neutron flux and extend the life time of the nuclear power plant.

What is claimed is:

1. A device for use in a fuel assembly of a nuclear power plant, the device comprising:

at least one rod, each rod comprising a plurality of containers having a space being filled with material to be activated; and a flow restrictor for a fuel assembly of a nuclear power plant, the flow restrictor comprising a plurality of fingers, each finger being adapted to extend into a control rod guide tube of the fuel assembly, the at least one rod being connected to a finger of the flow restrictor, the containers being arranged subsequently in a direction of a longitudinal axis of the respective rod, wherein the containers are connected to each other at connecting portions with one or more screw connection, each rod having been pressed or squeezed to form a marking corresponding to the connecting portion and to disable loosening of the screw connection, wherein each marking is in a direction of the longitudinal axis of the rod, and wherein each marking identifies the end of the space in a container and/or the end of the container;

the device including at its upper end a coupling piece, the coupling piece including a spring to fix the device within the fuel assembly.

2. The device according to claim 1, wherein the at least one rod further includes a hollow tube, which extends from the fingers, wherein the containers are arranged within the hollow tube.

3. The device according to claim 1, wherein the connecting portions are marked on an exterior side of the rod.

4. The device according to claim 1, wherein the at least one rod further includes a hollow tube, an outer diameter of the containers or the at least one hollow tube corresponds to an inner diameter of the control rod guide tubes.

5. The device according to claim 4, wherein the outer diameter of the containers or the at least one hollow tube is about 100 μm smaller than the inner diameter of the control rod guide tube of the fuel assembly.

6. The device according to claim 1, wherein the containers are made of stainless steel, Al-alloy or Zr-alloys.

7. The device according to claim 1, wherein a material to be achieved by the material to be activated is a radioactive isotope of Co, Mo, Sr, Y or combinations thereof.

8. The device according to claim 1, wherein the rod is connected to the flow restrictor using one or more screw connections or a welding.

9. The device according to claim 1, wherein the flow restrictor has a shape of a control rod assembly upper portion.

10. The device according to claim 1, wherein the fingers have a length adapted to extend at least 15 cm into the control rod guide tubes.

11. The device according to claim 1, wherein the flow restrictor is made of zirconium.

12. A method for activating a material in a nuclear power plant comprising the following steps:

providing a device for use in a fuel assembly of a nuclear power plant, the device comprises at least one rod, each rod comprises a plurality of containers having a space being filled with material to be activated, the device further including a flow restrictor for a fuel assembly of a nuclear power plant, the flow restrictor comprising: a plurality of fingers adapted to extend respectively into a control rod guide tube of the fuel assembly, the at least one rod being connected to a finger of the flow restrictor, the containers being arranged subsequently in a direction of a longitudinal axis of the respective rod, wherein the containers are connected to each other at connecting portions with one or more screw connection, each rod having been pressed or squeezed to form a marking corresponding to the connecting portion and to disable loosening of the screw connection, wherein each marking is in a direction of the longitudinal axis of the rod, and wherein each marking identifies the end of the space in a container and/or the end of the container;

the device including at its upper end a coupling piece, the coupling piece including a spring to fix the device within the fuel assembly;

inserting the device into a fuel assembly and, during outage of the nuclear power plant, providing the fuel assembly into a nuclear core of the nuclear power plant, or inserting the device during outage of the nuclear power plant into a fuel assembly of the nuclear core;

operating the nuclear power plant; and during outage of the nuclear power plant, removing the fuel assembly from the nuclear core of the nuclear power plant.

13. The method of claim 12, further comprising:

removing the at least one rod from the fuel assembly, and cutting the at least one rod into segments.

* * * * *